(12) United States Patent
Fujimoto et al.

(10) Patent No.: US 7,013,676 B2
(45) Date of Patent: Mar. 21, 2006

(54) PRESS MOLDING APPARATUS

(75) Inventors: Tadayuki Fujimoto, Hachioji (JP); Kishio Sugawara, Hamura (JP); Shinichiro Hirota, Fuchu (JP); Hiroyuki Sakai, Tokyo (JP); Hidemi Tajima, Hamura (JP)

(73) Assignee: Hoya Corporation, Tokyo (JP)

( * ) Notice: Subject to any disclaimer, the term of this patent is extended or adjusted under 35 U.S.C. 154(b) by 538 days.

(21) Appl. No.: 10/216,450

(22) Filed: Aug. 12, 2002

(65) Prior Publication Data

US 2003/0033833 A1 Feb. 20, 2003

(30) Foreign Application Priority Data

Aug. 10, 2001 (JP) .............................. 2001-244193
Aug. 13, 2001 (JP) .............................. 2001-245360

(51) Int. Cl.
*B29D 11/00* (2006.01)
(52) U.S. Cl. .................................... 65/319; 65/275
(58) Field of Classification Search ................. 65/102, 65/269, 274, 275, 286, 291, 305–306, 310, 65/319, 323
See application file for complete search history.

(56) References Cited

U.S. PATENT DOCUMENTS

| | | | | |
|---|---|---|---|---|
| 3,833,347 A | * | 9/1974 | Angle et al. .................. 65/32.5 |
| 3,837,825 A | * | 9/1974 | Loxley et al. ............... 264/662 |
| 4,132,538 A | * | 1/1979 | Eolin et al. .................. 65/32.5 |
| 4,240,780 A | * | 12/1980 | Carcey ........................ 425/407 |
| 4,481,023 A | * | 11/1984 | Marechal et al. .............. 65/64 |
| 4,747,864 A | * | 5/1988 | Hagerty et al. ............... 65/102 |
| 4,778,505 A | * | 10/1988 | Hirota et al. ................. 65/102 |
| 4,854,958 A | * | 8/1989 | Marechal et al. .............. 65/64 |
| 5,188,650 A | * | 2/1993 | Nomura ........................ 65/64 |
| 5,282,878 A | * | 2/1994 | Komiyama et al. ........... 65/162 |
| 5,346,523 A | * | 9/1994 | Sugai et al. .................. 65/102 |
| 5,851,252 A | * | 12/1998 | Sato et al. .................... 65/24 |
| 6,305,194 B1 | * | 10/2001 | Budinski et al. .............. 65/105 |
| 6,385,997 B1 | * | 5/2002 | Nelson et al. ................. 65/64 |
| 6,442,975 B1 | * | 9/2002 | Murakami et al. ............. 65/61 |
| 6,813,906 B1 | * | 11/2004 | Hirota et al. ................. 65/323 |
| 2003/0066312 A1 | * | 4/2003 | Sakai et al. ................... 65/102 |
| 2003/0107146 A1 | * | 6/2003 | Hosoe et al. ................. 65/102 |
| 2004/0041303 A1 | * | 3/2004 | Kim et al. .................... 264/320 |
| 2004/0050108 A1 | * | 3/2004 | Winters et al. ........... 65/374.11 |
| 2005/0126226 A1 | * | 6/2005 | Winters et al. ............... 65/102 |

FOREIGN PATENT DOCUMENTS

JP      8-133756      5/1996
JP      2001-10829      1/2001

* cited by examiner

Primary Examiner—Steven P. Griffin
Assistant Examiner—Carlos Lopez
(74) Attorney, Agent, or Firm—Sughrue Mion, PLLC

(57) ABSTRACT

In a press molding apparatus for press molding a plurality of glass materials into a plurality of glass optical elements by the use of a pressing mold including upper and lower molds each of which has a plurality of molding surfaces, at least one of the upper and the lower molds is a heat generator within which heat is generated when the heat generator is subjected to a high-frequency induction heating by an induction heating coil. The heat generator having a plurality of shape-processed portions (130) produced by partially processing a shape of the heat generator in order that a temperature distribution of the heat generator is adjusted. The apparatus simultaneously press forms, into the glass optical elements, the glass materials supplied between the molding surfaces of the upper and the lower molds which are subjected to the high-frequency induction heating.

10 Claims, 13 Drawing Sheets

PRESS MOLDING APPARATUS

BACKGROUND OF THE INVENTION

This invention relates to production of a glass optical element such as an optical lens and, in particular, to a press molding apparatus for press molding a preform (obtained by preliminarily forming a glass material) in a heated and softened state to provide a predetermined shape. This invention also relates to a method of producing a glass optical element by the use of the above-mentioned press-forming apparatus.

Recently, in a field of production of an optical element such as an optical lens, it is desired to obtain a high-accuracy lens shape without carrying out surface polishing. To this end, proposal is made of a method comprising the steps of preparing a preform by preliminarily forming a glass material into a provisional shape approximate to a desired shape, heating and softening the preform, and pressing the preform by the use of a pressing mold having a high-accuracy pressing surface (for example, see Japanese Unexamined Patent Publication JP 2001-10829 A).

A press molding apparatus of the type is formed so that a plurality of (for example, four) preforms are simultaneously pressed by the use of a pressing mold comprising an upper mold and a lower mold. The upper and the lower molds are surrounded by an induction heating coil so that the upper and the lower molds are heated to a predetermined temperature by high-frequency induction heating. The upper and the lower molds clamp and press the preforms preliminarily heated and softened to thereby provide each preform with a high-accuracy processed surface.

For example, FIG. 1 shows a basic structure of a typical press molding apparatus of the type mentioned above. The press molding apparatus illustrated in FIG. 1 has a pressing mold comprising an upper mold 502 and a lower mold 504. Each of the upper and the lower molds 502 and 504 has an elongated shape extending in a transversal or horizontal direction in the figure. The upper and the lower molds 502 and 504 are supported by upper and lower supporting members 506 and 508, respectively. The upper supporting member 506 is attached to a fixed shaft 510 while the lower supporting member 508 is attached to a drive shaft 512 of a motor mechanism or the like. The upper and the lower molds 502 and 504 have a plurality of molding portions 514 and 516 formed on confronting surfaces thereof, respectively, to provide preforms with a lens shape. To a position between the upper and the lower molds 502 and 504, the preforms each of which is preliminarily formed into a desired provisional shape are transferred after heated by a heating unit (not shown) to a predetermined temperature, for example, to a temperature corresponding to a viscosity between $10^{5.6}$ and $10^9$ poises. The upper and the lower molds 502 and 504 are surrounded by induction heating coils 518 and 520 for heating the upper and the lower molds 502 and 504, respectively. The upper and the lower molds 502 and 504, which are preliminarily heated, clamp and press the preforms in a softened state to thereby form high-accuracy processed surfaces on the preforms.

In the meanwhile, upon producing the optical element by precision pressing, accuracy and productivity are important aspects.

In this sense, anisothermal pressing (Japanese Unexamined Patent Publication JP 08-133756 A) has contributed to epoch-making progress. Specifically, by shortening a heating cycle of the pressing mold as compared with existing isothermal pressing, a cycle time required to form the glass optical element can be shortened to the order of several tens of seconds. In addition, surface accuracy and profile accuracy can be kept superior.

Taking the production efficiency into account, attention is directed to a method of obtaining a plurality of optical elements in one heating cycle, i.e., a multiproduct batch process. As far as the heating cycle is essential and requires a predetermined time period, the productivity can be improved if a plurality of optical elements are simultaneously produced in the heating cycle.

In the anisothermal pressing, a glass material is preliminarily heated at a position apart from the pressing mold and thereafter supplied to the pressing mold so that the glass material supplied to the pressing mold is made at a preheat temperature different from that of the pressing mold (frequently, at a temperature higher than that of the pressing mold). In order to avoid product variation, a plurality of glass materials are heated to the same preheat temperature to be uniform in viscosity when they are supplied to the pressing mold. The pressing mold is also heated to a predetermined temperature. In this event, a plurality of molding surfaces must be heated under the conditions as same as possible and, after pressing, must be cooled under the conditions as same as possible. Heating of the molding surfaces under the same condition (i.e., thermal uniformity) is a problem which is not negligible.

As a heat source, use may be made of various options such as resistance heating and induction heating. In order to heat the molding surfaces under the same condition and to avoid occurrence of a local temperature gramoldnt in each single molding surface, the heat source and the molding surfaces are limited in position relative to each other and the molding surfaces are located at an equal distance from the heat source. Thus, upon designing the apparatus, consideration must be made about thermal uniformity. Furthermore, rapid temperature elevation as efficient as possible contributes to the productivity. In view of continuous production, the heating condition must be easily reproducible.

In the meanwhile, one of design options for the pressing mold capable of simultaneously producing a plurality of optical elements is to dispose a plurality of molding surfaces in a single-line arrangement (see JP 2001-10829 A). Such single-line arrangement is advantageous in the following respects. That is, the structure of the pressing mold is simple. In particular, consideration will be made of supply of the glass materials to the pressing mold. In a state where the glass materials are arranged in a single line, a supplying member is split by a straight line into two parts to drop the glass materials through a gap between the two parts. With such a simple mechanism, the glass materials are simultaneously supplied onto the pressing mold (i.e., to the respective molding surfaces).

In order to drop the glass material in a heated and softened state, the glass material in the softened state is floated on a floating saucer by the use of a gas and then dropped and supplied to the pressing mold. This technique is advantageous in that the glass material is stably supplied without damaging the surface of the glass material. For example, by arranging a plurality of floating saucers in a single line and splitting each floating saucer into two parts, the glass materials are simultaneously dropped through gaps between the two parts onto the molding surfaces arranged in a single line. In this case, the apparatus is relatively simple in structure. Thereafter, press molding can be immediately performed before the temperature of the glass material is changed from the preheat temperature. The above-mentioned technique is very advantageous in that the productivity is high and a plurality of optical elements can be stably produced with high accuracy under a thermally uniform condition.

However, the single-line arrangement of the molding surfaces is disadvantageous in the following respect. Specifically, it is difficult to uniformly heat the molding surfaces in the single-line arrangement. Generally, it is difficult to uniformly distribute the heat from the heat source to a plurality of molding surfaces arranged in a single line so that the molding surfaces are heated under the same condition. In case where three or more molding surfaces are arranged in a single line, heat energy supplied from the heat source is different in amount between the molding surface at the center and the molding surfaces at both ends. Such difficulty is encountered by any kind of heat source. For example, even in case where a high-frequency induction heating apparatus extremely high in heat efficiency and high in responsiveness upon temperature elevation and temperature drop (i.e., high in productivity) is used, it is not easy in actual design to arrange the induction heating coil so that all molding surfaces are heated under the same condition.

SUMMARY OF THE INVENTION

It is therefore an object of this invention to provide a press molding apparatus and a method of producing a glass optical element which are capable of increasing a temperature elevation rate of a pressing mold.

It is another object of this invention to provide a press molding apparatus and a method of producing a glass optical element which are capable of improving thermal uniformity in a pressing mold.

It is still another object of this invention to provide an apparatus and a method for producing a glass optical element which are high in accuracy and productivity.

Other objects of this invention will become clear as the description proceeds.

According to this invention, there is provided a press molding apparatus for preparing a plurality of glass optical elements from a plurality of glass materials, comprising upper and lower molds each of which comprises a plurality of molding surfaces, and an induction heating device for heating the upper and lower molds, at least one of the upper and lower mold comprising a heat generator within which heat is generated when the heat generator is subjected to high-frequency induction heating by the induction heating device, the heat generator comprising a shape-processed portion produced by processing a shape of the heat generator in order that a temperature distribution of the heat generator is adjusted when the heat generator is subjected to high-frequency induction heating.

According to this invention, there is also provided a method of press molding a plurality of glass materials into a plurality of glass optical elements by use of a pressing mold comprising upper and lower molds each of which comprises a plurality of molding surfaces, at least one of the upper and lower mold comprising a heat generator within which heat is generated when the heat generator is subjected to high-frequency induction heating, the heat generator comprising a shape-processed portion produced by processing a shape of the heat generator in order that a temperature distribution of the heat generator is adjusted when the heat generator is subjected to high-frequency induction heating, comprising the steps of subjecting the upper and the lower molds to the high-frequency induction heating so that the molding surfaces of the upper mold and the lower mold have predetermined temperatures, and simultaneously press molding, into the glass optical elements, the glass materials supplied between the molding surfaces of the upper and the lower molds.

DESCRIPTION OF THE PREFERRED EMBODIMENTS

At first, the principle of this invention will be described.

The present inventors have found that the above-mentioned problems can be solved by improving the shape of a pressing mold.

Specifically, a heat generator for generating heat by high-frequency induction generates heat easily in an area around its surface and also in a portion having an acute-angled shape. By modifying the shape of the heat generator by, for instance, placing a cutout or a perforation, or making the corner which is preferably rounded, it is possible to promote overall heating or to relatively suppress heating in a local area as compared with a remaining area. Thus, by processing the shape of the heat generator for generating heat by induction heating, heat promotion is performed to increase the temperature elevation efficiency or heat promotion or suppression is locally performed to achieve thermal uniformity. Thus, it is possible to equalize the thermal conditions of a plurality of molding surfaces and to control the heating with high accuracy. In other words, the shape of the heat generator is given a function of adjusting temperature distribution.

The inventors have found out that, even if a pressing mold supporting a plurality of molding surfaces disposed in a linear arrangement is used, those parts difficult in temperature elevation are subjected to a shaping process for improving the heating efficiency so that overall thermal uniformity is achieved and a plurality of molding surfaces of the pressing molds are heated under the same condition. As a consequence, a glass optical element can be formed with high accuracy.

Figure 1:
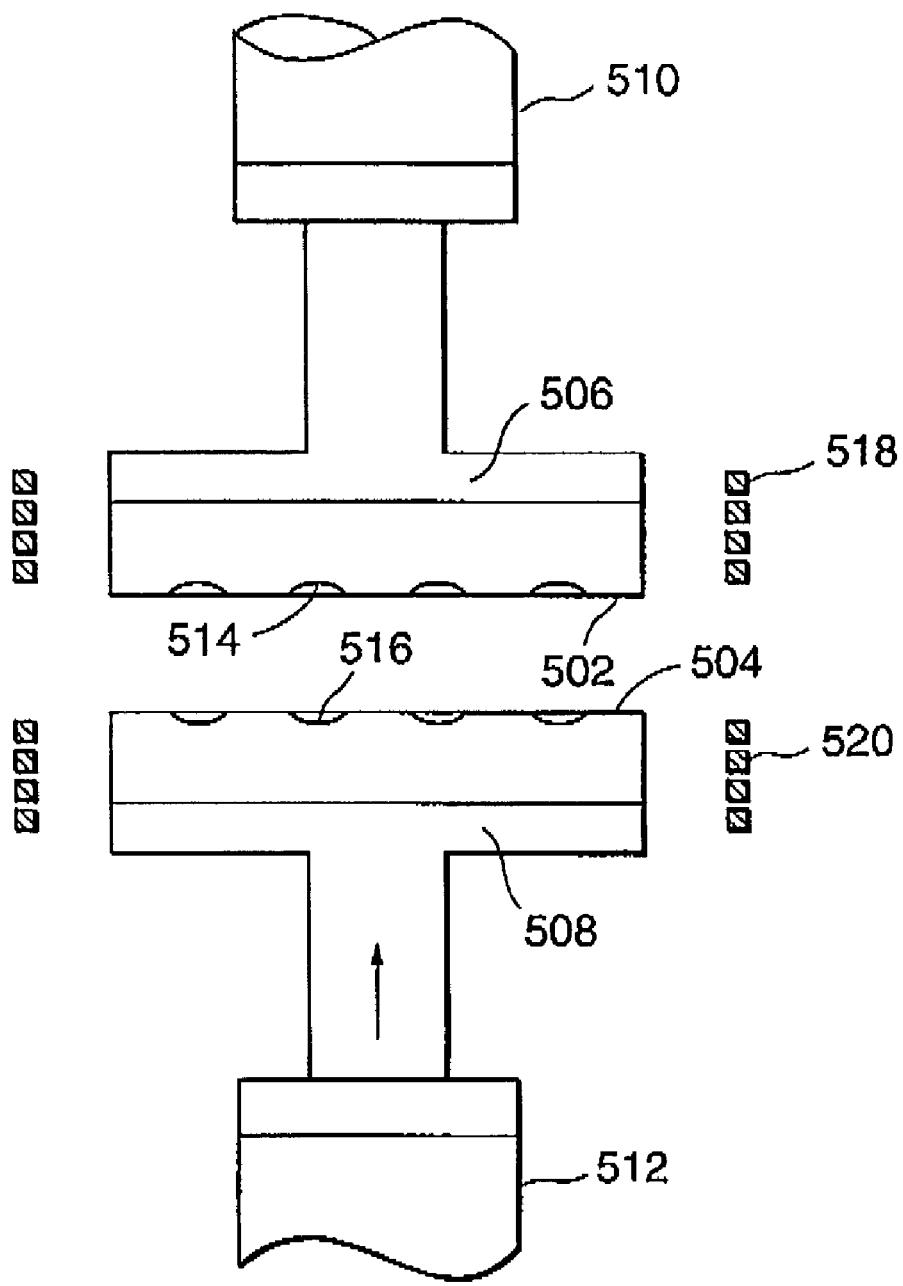
FIG. 1 shows an existing press molding apparatus.

In FIG. 1, each of the upper and the lower molds 502 and 504 has, for example, a shape elongated in one direction. Therefore, it is difficult to uniformly heat an entire area by high-frequency induction heating. This is because the molding surfaces of both ends tend to be more efficiently heated, as compared with the molding surfaces being in the middle position, by the coil surrounding the pressing mold. Furthermore, in order to heat the molding surfaces in the middle position more efficiently, it can be proposed to divide each of the upper and the lower molds 502 and 504 into split parts adjacent to each other in the longitudinal direction. However, if the split parts have angled corners, such corners could be heated excessively by induction heating. The present invention proposes the suitable adjustment of the molding temperature by processing the shape of the material used as heat generator, which leads to the molding with high accuracy and productivity.

Now, preferred embodiments of this invention will be described in detail with reference to the drawing.

Figure 2:
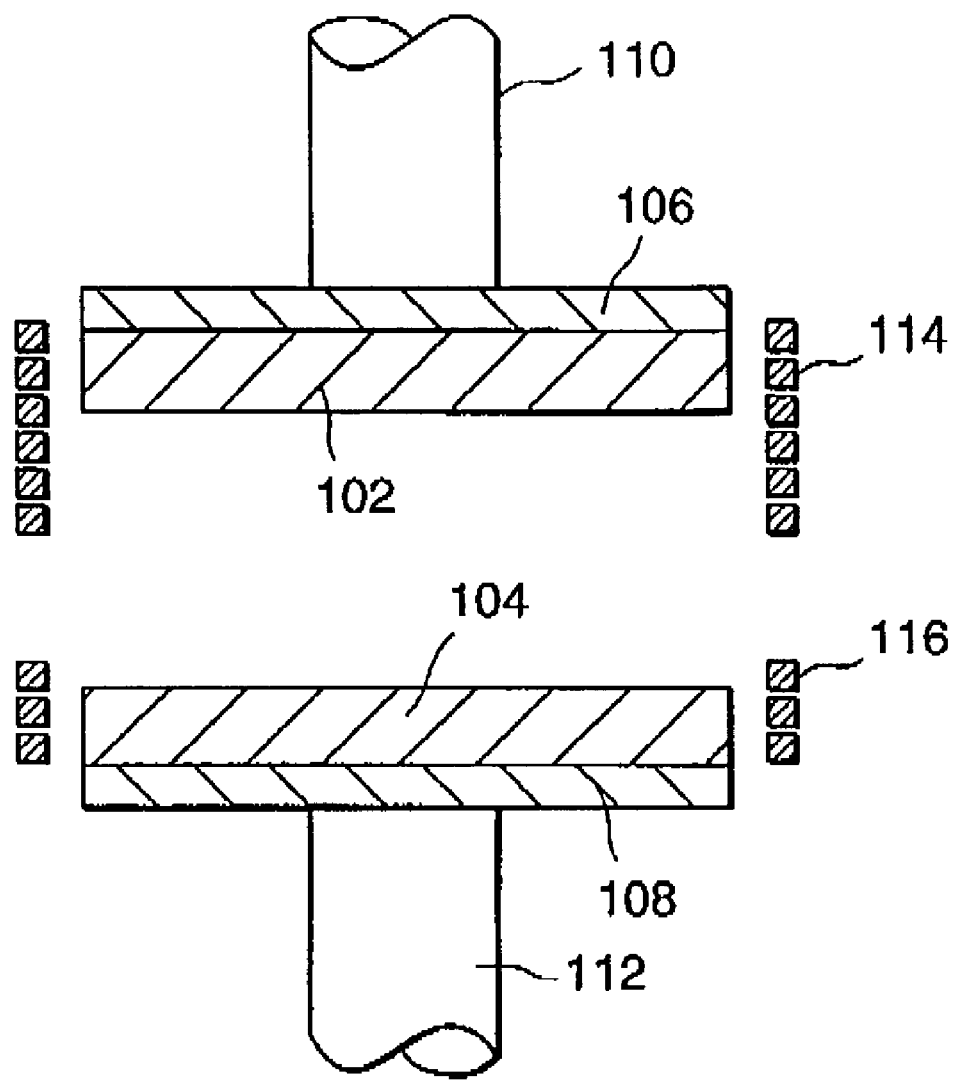
FIG. 2 shows a press molding apparatus according to a first embodiment of this invention.

At first referring to FIG. 2, a press molding apparatus according to a first embodiment of this invention will be described. For example, the press molding apparatus is used to produce a medium-aperture lens having a diameter of 17 mm by the use of a preform having a flat spherical shape. The press molding apparatus has a pressing mold comprising an upper mold 102 and a lower mold 104 for clamping and pressing the preform. Each of the upper and the lower molds 102 and 104 has an elongated shape extending in a transversal or horizontal direction in the figure and is made of, for example, a tungsten alloy. The upper and the lower molds 102 and 104 have a plurality of molding portions (which will later be described) formed on confronting surfaces thereof, respectively, to provide preforms with a predetermined shape. The upper and the lower molds 102 and 104 are attached through supporting members 106 and 108 to upper and lower main shafts 110 and 112, respectively, on the sides opposite to the confronting surfaces. The upper main shaft 110 is fixed to an apparatus frame (not shown) while the lower main shaft 112 is driven by a motor (not shown) in a vertical direction. Thus, by driving the lower main shaft 112, the upper and the lower molds 102 and 104 are opened and closed. The upper and the lower molds 102 and 104 are surrounded by induction heating coils 114 and 116 for high-frequency induction heating the upper and the lower molds 102 and 104, respectively. Alternatively, the upper and the lower molds 102 and 104 may be heated by a single common induction heating coil.

Figure 3:
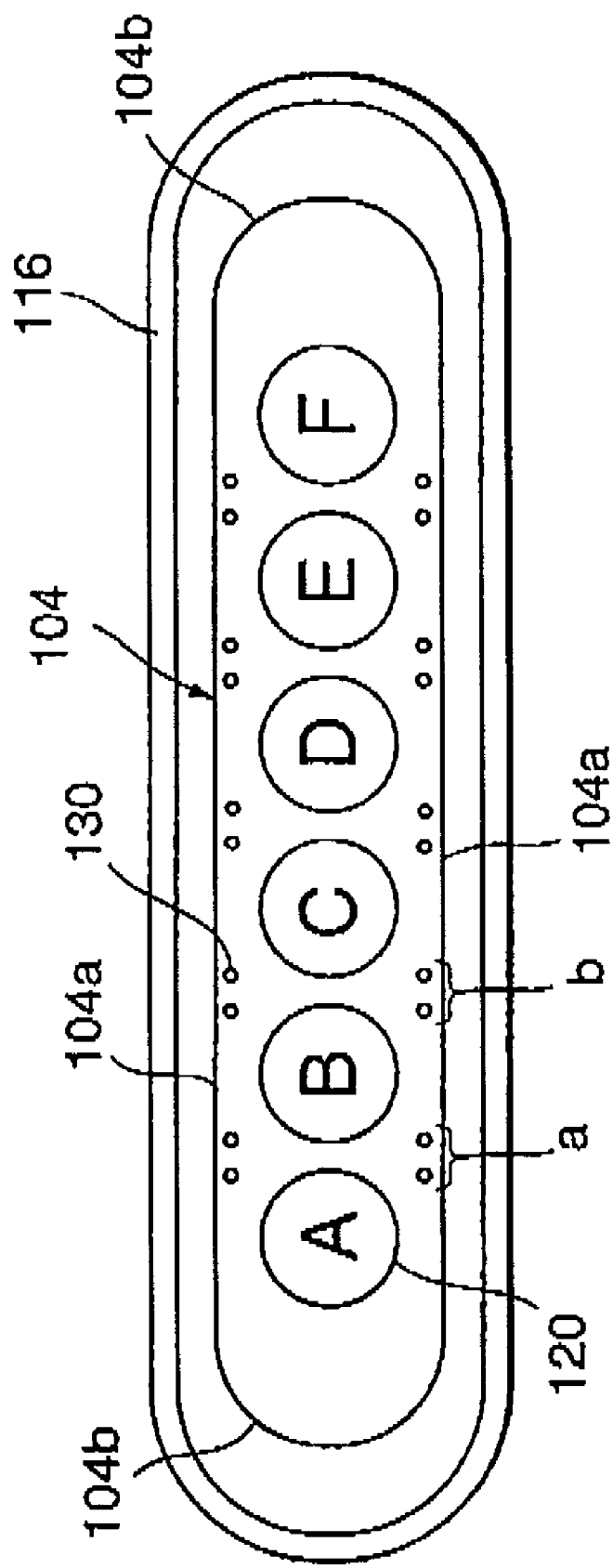
FIG. 3 is a plan view of an example of a lower mold in FIG. 2.

Referring to FIG. 3, the lower mold 104 and the induction heating coil 116 therearound are shown in plan view as seen from the above. Although not shown in the figure, the upper mold 102 is similar in shape in plan view to the lower mold 104. The lower mold 104 has a pair of long sides 104a extending in parallel to each other and a pair of semicircular arc shaped sides 104b located at opposite ends of the long sides 104a. Each of the semicircular arc-shaped sides 104b defines an arc of a half circle having a radius equal to a half of the distance between the two long sides 104a (i.e., the width of the lower mold 104). The induction heating coil 116 is wound around the lower mold 104 in a shape corresponding to an outer periphery of the lower mold 104. Longitudinal ends of the lower mold 104 may be formed into a shape such that the distance from the induction heating coil 116 is greater or a shape such that the distance between the molding portion (which will later be described) and the longitudinal end in the longitudinal direction is greater than that in the transversal direction.

The lower mold 104 has an upper surface provided with the molding portions (recessed portions) 120, six in number, for imparting a glass product shape to the preforms. These molding portions 120 are arranged in a single line along the longitudinal direction of the lower mold 104. The six molding portions 120 have preform pressing surfaces as molding surfaces A, B, C, D, E, and F, respectively. It is noted here that the upper mold 102 also has six molding portions formed at positions corresponding to the molding portions 120 of the lower mold 104.

The lower mold 104 is provided with a number of perforations 130 arranged in a zone along the outer periphery thereof. The perforations 130 serve to promote heating when high-frequency induction heating is performed and to improve the temperature elevation rate of the lower mold 104. Presumably, such heating promotion effect is obtained for the following reason. Upon high-frequency induction heating, there arises a phenomenon, called a skin effect, such that an electric current flows in the vicinity of the outer periphery of the lower mold 104. Presence of the perforations 130 narrows a flow path of the electric current to increase an electric resistance. As a consequence, Joule heat is generated to elevate the temperature. For example, each of the perforations 130 is a through hole having a circular section and penetrating the lower mold 104 in its thickness direction. The perforation 130 has an inner diameter preferably within a range between 0.5 mm and 5.0 mm. If the inner diameter of the perforation 130 is smaller than 0.5 mm, the heating promotion effect is weak. If the inner diameter exceeds 5.0 mm, the number of perforations which can be formed is decreased so that the heating promotion effect is decreased.

If the perforations 130 are densely arranged in the lower mold 104 in a local region corresponding to an area relatively uneasily heated during high-frequency induction heating (hereinafter may be referred to as a relatively uneasily heated area), temperature distribution of the lower mold 104 can be kept uniform. Distribution of easily heated areas is determined by the distance from a peripheral edge of the lower mold 104, the shapes and the sizes of the induction heating coil 116 and the lower mold 104, the position of the molding portion 120 in the lower mold 104, and so on. Taking these factors into consideration, the perforations 130 are preferably formed in the local region corresponding to the uneasily heated area. For example, within a peripheral region along the outer periphery of the lower mold 104, the perforations 130 are preferably formed in a local region relatively apart from each molding portion 120. More specifically, the perforations 130 are preferably formed, within the peripheral region along the outer periphery of the lower mold 104, in a local region corresponding to an area between adjacent ones of the molding surfaces A to F (for example, a local region a corresponding to an area between the molding surfaces A and B, a local region b corresponding to an area between the molding surfaces B and C). Such local region is referred to as "a local region corresponding to an area between adjacent ones of the molding surfaces".

The upper mold 102 is also provided with perforations similar to those of the lower mold 104. The arrangement of the perforations is similar to that of the perforations 130 in the lower mold 104.

Next, description will be made of a method of producing a lens (as a glass optical element) according to the embodiment. At first, by high-frequency induction heating of the induction heating coils 114 and 116, the upper and the lower molds 102 and 104 are heated, respectively. Next, the preforms preliminarily formed into a flat spherical shape are supplied to the lower mold 104 after the preforms are preheated to a temperature higher than that of the molding surfaces A to F of the upper and the lower molds 102 and 104. In order to supply the preforms to the lower mold 104, the preforms are positioned above the molding surfaces A to F of the lower mold 104 by the use of a positioning member (not shown) and are dropped onto the lower mold 104. Thereafter, the lower main shaft 112 is moved upward to press the six preforms between the upper and the lower molds 102 and 104. Thus, glass products having a desired shape are formed. By the heating promotion effect of the perforations 130 formed in the upper and the lower molds 102 and 104, the upper and the lower molds 102 and 104 are improved in temperature elevating rate. Therefore, even if the upper and the lower molds 102 and 104 are required to be heated further after the preforms are supplied, the upper and the lower molds 102 and 104 can be quickly heated to a desired temperature. As a consequence, pressing can be quickly carried out while the decrease in temperature of the preforms is minimized. Furthermore, since the perforations 130 are densely arranged in the upper and the lower molds 102 and 104 in the local region corresponding to the relatively uneasily heated area, the temperature distribution in each of the upper and the lower molds 102 and 104 is kept uniform. After completion of pressing of the preforms by the upper and the lower molds 102 and 104, the lower main shaft 112 is moved downward to open or separate the upper and the lower molds 102 and 104. Subsequently, by the use of a removing member (not shown), six glass optical elements left on the lower mold 104 are sucked and removed. Thus, lenses surface-processed with high precision are obtained as the glass optical elements.

As described above, according to the press molding apparatus and the production method according to the embodiment, the upper and the lower molds 102 and 104 are provided with the perforations 130 to generate a greater amount of heat upon high-frequency induction heating. Therefore, the upper and the lower molds 102 and 104 are improved in temperature elevation rate. This makes it possible to shorten a cycle time of production and to improve the production efficiency. Furthermore, the perforations 130 are densely arranged in the local region corresponding to the relatively uneasily heated area mentioned above. Therefore, temperature distribution in each of the upper and the lower molds 102 and 104 can be kept uniform.

Figure 4A:
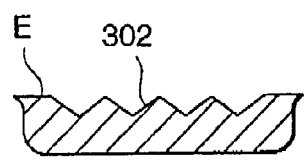
FIGS. 4A to 4C show first through third modifications of the lower mold in FIG. 3.
Figure 4B:
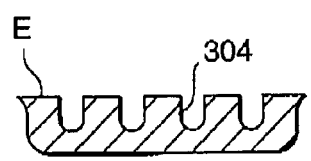
Figure 4C:
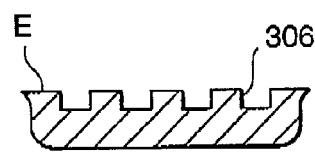

Next, description will be made of first through third modifications of the above-mentioned embodiment. In the above-mentioned embodiment the upper and the lower molds 102 and 104 are provided with the perforations 130. Instead of the perforations 130, a plurality of cutouts illustrated in FIGS. 4A to 4C may be provided. The cutouts are formed on an outer peripheral end face (side end face) E of each of the upper and the lower molds 102 and 104. In the first modification illustrated in FIG. 4A, the outer peripheral end face E of each mold is subjected to knurling to continuously form a plurality of V-shaped cutouts 302. In the second modification illustrated in FIG. 4B, a number of cutouts 304 are formed on the outer peripheral end face E of each mold at predetermined intervals. Each of the cutouts has a curved bottom. In the third modification illustrated in FIG. 4C, a number of cutouts 306 are formed on the outer peripheral end face E of each mold at predetermined intervals. Each of the cutouts 306 has a flat bottom. In the modifications illustrated in FIGS. 4A to 4C, those regions around the cutouts 302 to 306 locally generate a greater amount of heat upon high-frequency induction heating. Therefore, like in the above-mentioned embodiment, the temperature elevation rate of each mold can be improved. Furthermore, by densely forming the cutouts 302 to 306 in the relatively uneasily heated area of each of the upper and the lower molds 102 and 104, the temperature distribution in each mold can be kept uniform. Although not shown in the figure, the outer peripheral end face E of each of the upper and the lower molds 102 and 104 may be provided with a plurality of perforations.

It is possible to use a combination of the perforations 130 in the above-mentioned embodiment and the cutouts in the modifications.

Figure 5:
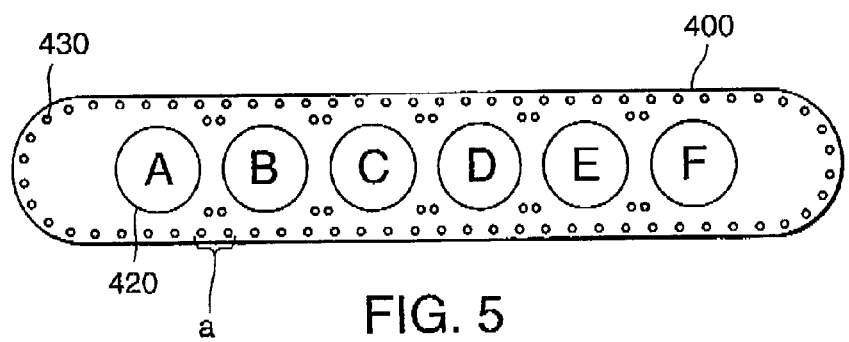
FIG. 5 shows a fourth modification of the lower mold in FIG. 3.

Next, description will be made of a fourth modification of the above-mentioned embodiment. Referring to FIG. 5, a lower mold 400 is shown in plan view. An upper mold to be combined with the lower mold 400 is similar in shape in plan view to the lower mold 400 and is not illustrated in the figure. As shown in FIG. 5, the lower mold 400 has an elongated shape and is provided with six molding portions 420 arranged along its longitudinal direction to provide the preforms with a predetermined shape. The lower mold 400 has a number of perforations 430 formed throughout an entire periphery thereof. Specifically, the perforations 430 in a peripheral region of the lower mold 400 are particularly densely formed in local regions relatively apart from the molding portions 420, as compared with those regions closer to the molding portions 420. More specifically, within the region along the outer periphery of the lower mold 400, the perforations 430 are particularly densely arranged in a local region corresponding to an area between adjacent ones of the molding surfaces A to F (for example, a local region a corresponding to the space between the molding surfaces A and B). In the fourth modification also, a greater amount of heat is generated around the perforations 430 during high-frequency induction heating. Therefore, it is possible to increase the temperature elevation rate of each of the lower mold 400 and the upper mold and to achieve uniform temperature distribution in each mold. Instead of the perforations 430, the cutouts illustrated in FIGS. 4A to 4C may be provided. Alternatively, use may be made of a combination of the perforations 430 and the cutouts.

Figure 6:
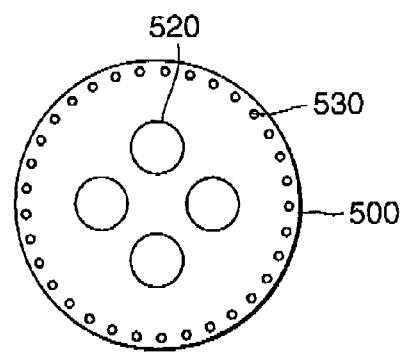
FIG. 6 shows a fifth modification of the lower mold according to the first embodiment of the invetion.

Next, description will be made of a fifth modification of the above-mentioned embodiment. Referring to FIG. 6, a lower mold 500 is shown in plan view. An upper mold to be combined with the lower mold 500 is similar in shape in plan view to the lower mold 500 and is not illustrated in the figure. As illustrated in FIG. 6, the lower mold 500 has a circular shape and is provided with a plurality of molding portions 520 in its center region. The lower mold 500 has a number of perforations 530 similar to those of the above-mentioned first embodiment. The perforations 530 are uniformly arranged throughout an entire outer periphery of the lower mold 500. In this modification also, by the heat promotion effect of the perforations 530, the temperature elevation rate of each of the lower mold 500 and the upper mold is increased and the temperature distribution in each mold is kept uniform. Instead of the perforations 530, the cutouts illustrated in FIGS. 4A to 4C may be provided. Alternatively, use may be made of a combination of the perforations 530 and the cutouts.

Next, description will be made of second through fourth embodiments of this invention. In each of these embodiments, a pressing mold comprises a plurality of lower and upper mold members having molding surfaces, respectively, and a mother mold supporting the lower and the upper mold members. The mother mold is made of a material easily heated by induction heating. The lower and the upper mold members are heated by heat conduction from the mother mold. The mother mold in each of these embodiments corresponds to one specific example of "the upper mold and/or the lower mold" in this invention.

Figure 7:
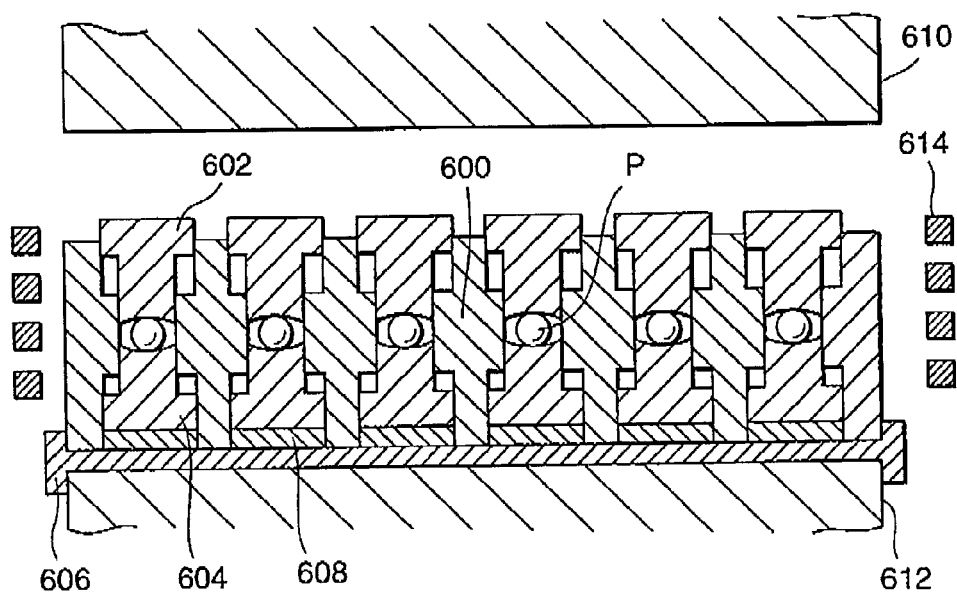
FIG. 7 shows a press molding apparatus according to a second embodiment of this invention.

Referring to FIG. 7, a press molding apparatus according to a second embodiment comprises a mother mold 600 having an elongated shape and six pairs of upper and lower mold members 602 and 604 supported by the mother mold 600 to be vertically movable. Each of the upper and the lower mold members 602 and 604 is made of cemented carbide and has a molding surface (i.e., a surface for pressing a preform P) coated with a thin film of a precious metal alloy. The mother mold 600 is made of a tungsten alloy and has a thermal expansion coefficient slightly greater than that of cemented carbide. The mother mold 600, the upper mold members 602, and the lower mold members 604 are supported on a tray 606 and transferred into a forming chamber (not shown), Between each of the lower mold members 604 and the tray 606, a spacer 608 is inserted to adjust the thickness of each lens. The tray 606 is mounted on a lower main shaft 612 driven in the vertical direction by a motor mechanism (not shown). By moving the lower main shaft 612 upward, the upper mold members 602 are brought into contact with a head (lower end face) of an upper main shaft 610 fixed to an apparatus frame (not shown). The mother mold 600 is surrounded by an induction heating coil 614 to heat the mother mold 600, the upper mold members 602, and the lower mold members 604 by high-frequency induction heating. The induction heating coil 614 is wound around the mother mold 600 of an elongated shape.

Figure 8:
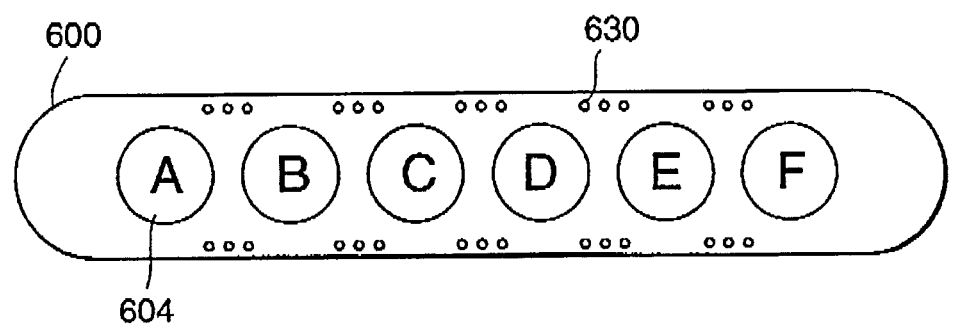
FIG. 8 is a plan view of a lower mold in FIG. 7.

Referring to FIG. 8, the pressing mold (the mother mold 600, the upper mold members 602, and the lower mold members 604) is seen from the above. In FIG. 8, the six lower mold members 604 have upper surfaces as molding surfaces A to F. In a peripheral region along the outer periphery of the mother mold 600, local regions corresponding to areas between every adjacent ones of the molding surfaces A to F are provided with perforations 630. The perforations 630 may be replaced by the cutouts illustrated in FIGS. 4A to 4C. Alternatively, use may be made of a combination of the perforations 630 and the cutouts.

As a specific example, a biconvex lens having an outer diameter of 15 mm was produced by the use of the above-mentioned press molding apparatus and a spherical preform P of barium borosilicate glass (having a transition point of 512° C. and a sagging point of 545° C.). Specifically, the spherical preform P was placed between each of the upper mold members 602 and each of the lower mold members 604 of the mother mold 600. The mother mold 600 was mounted on the tray 606 and introduced into a forming chamber (not shown) kept in an inactive atmosphere. The tray 606 was placed on the lower main shaft 612 (FIG. 7). Thereafter, the lower main shaft 612 was moved upward so that the mother mold 600 is located inside the induction heating coil 614. The induction heating coil 614 is supplied with a high-frequency current to induction heat the mother mold 600. At this time, the temperature of each of the lower molding surfaces A to F (the upper surfaces of the lower mold members 604) was measured by a mold temperature monitoring thermocouple inserted into each of the lower mold members 604. On the other hand, the temperature of each of the upper molding surfaces (the lower surfaces of the upper mold members 602) was measured by a mold temperature monitoring thermocouple inserted into each of the upper mold members 602. As a result, the temperature deviation among the lower molding surfaces A to F and the upper molding surfaces A to F was not greater than ±10° C. Then, the preform was heated by the induction heating coil 614 to 596° C. (the temperature corresponding to the glass viscosity of $10^8$ poises). Thereafter, the lower main shaft 612 was further moved upward to bring the upper surfaces of the upper mold members 602 into contact with the head of the upper main shaft 610 so that the preform P in a softened state was pressed. Subsequently, the lenses thus formed were cooled to a temperature not higher than the glass transition point. Thereafter, the lower main shaft 612 was moved downward and the lenses were removed together with the pressing mold. As a result, the lenses thus obtained were excellent in surface accuracy with less astigmatic aberration and without nonuniform extension.

Figure 9A:
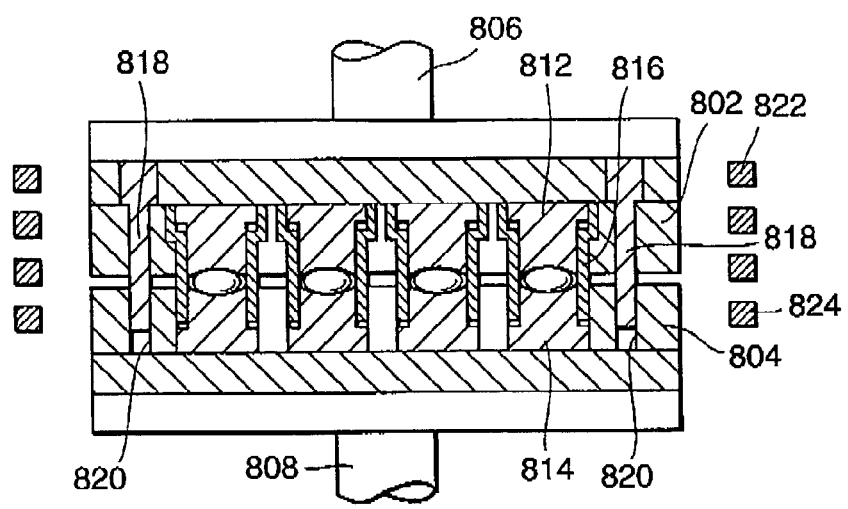
FIGS. 9A and 9B shows a press molding apparatus according to a third embodiment of this invention.
Figure 9B:
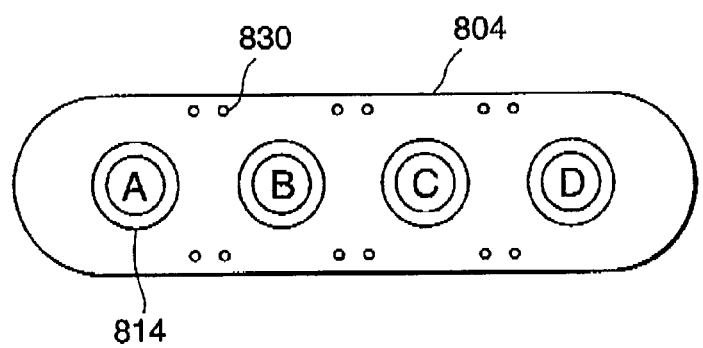

Referring to FIGS. 9A and 9B, description will be made of a press molding apparatus according to a third embodiment of this invention. The press molding apparatus according to the third embodiment comprises an upper mother mold 802 and a lower mother mold 804 attached to an upper main shaft 806 and a lower main shaft 808, respectively. Each of the upper and the lower mother mold 802 and 804 has an elongated shape. The upper mother mold 802 and the lower mother mold 804 are provided with four upper mold members 812 and four lower mold members 814, respectively. The upper and the lower mother molds 802 and 804 are surrounded by induction heating coils 822 and 824, respectively. Furthermore, each of the upper mold members 812 is provided with a sleeve 816 formed at its outer periphery and fitted to the lower mold member 814 with a small clearance to be slidable along the lower mold member 814. The sleeve 816 thus serves to prevent axial offset between upper and lower surface of a lens. The upper mother mold 802 is provided with guide pins 818 while the lower mother mold 804 is provided with guide holes 820 to be engaged with the guide pins 818. Each of the upper and the lower mother molds 802 and 804 is made of a tungsten alloy. Each of the upper mold members 812, the lower mold members 814, and the sleeves 816 is made of sintered silicon carbide with silicon carbide formed by CVD on the surface thereof. FIG. 9B shows the shape of the lower mother mold 804 in plan view. The upper mother mold 802 is similar in shape in plan view to the lower mother mold 804 and is not illustrated in the figure. The lower mold members 814 have preform pressing surfaces as molding surfaces A to D. Within a region along the outer periphery of the lower mother mold 804, a plurality of perforations 830 are formed in local regions corresponding to areas between every adjacent ones of the molding surfaces A to D. The perforations 830 may be replaced by the cutouts illustrated in FIGS. 4A to 4C. Alternatively, use may be made of a combination of the perforations 830 and the cutouts.

As a specific example, a biconvex lens (one surface being a spherical surface, the other surface being an aspherical surface) having an outer diameter of 15 mm was formed by pressing barium borosilicate glass (having a transition point of 512° C. and a sagging point of 545° C.) using the above-mentioned press molding apparatus. Specifically, preforms of a marble-like shape prepared by hot forming and having no surface defect were preheated to 470° C. The preforms, four in number, were supplied onto the lower mold members 814, four in number, of the lower mother mold 804 preheated to about 470° C. Immediately thereafter, the lower mother mold 804 was moved upward to be coupled with the upper mother mold 802 preheated to 470° C. At this time, the guide pins 818 and the guide holes 820 were engaged with each other and the sleeves 816 were fitted over the lower mold members 814, respectively. By high-frequency induction heating by the induction heating coil 822, the upper and the lower mother molds 802 and 804 were heated so that the preforms were heated to 596° C. (i.e., the temperature at which the preform has a viscosity of $10^8$ poises). At this time, the temperature deviation among the lower molding surfaces A to D (the upper surfaces of the lower mold members 814) and the upper molding surfaces (the lower surfaces of the upper mold members 812) was measured by the use of mold temperature monitoring thermocouples. As a result, the temperature deviation was not greater than ±10° C. Thereafter, the lower mother mold 804 was moved upward to perform press molding at a pressure of 70 kg/cm². After completion of the pressing, the lenses thus formed were cooled at a cooling rate of 50° C./min to a temperature not higher than the glass transition point. At this time, each of the upper mold members 812 followed the shrinkage of the lens and the lens was cooled under the weight of the upper mold member 812 alone. In other words, the upper surface of the lens was kept in contact with the upper mold member 812 during cooling. When the temperature was lowered to 490° C., the lower mother mold 804 was moved downward to separate the upper and the lower mother molds 802 and 804 from each other. The lower mother mold 804 was further moved downward to a lower part of a forming chamber (not shown). By the use of a suction pad, four lenses were removed. The lenses thus removed may thereafter be annealed if desired. In these molds (the upper and the lower mother molds 802 and 804, the upper and the lower mold members 812 and 814), substantially uniform heating and cooling were performed. The lenses thus obtained were high in surface accuracy and excellent in surface quality. In addition, eccentricity or decenter after centration was well suppressed.

Figure 10:
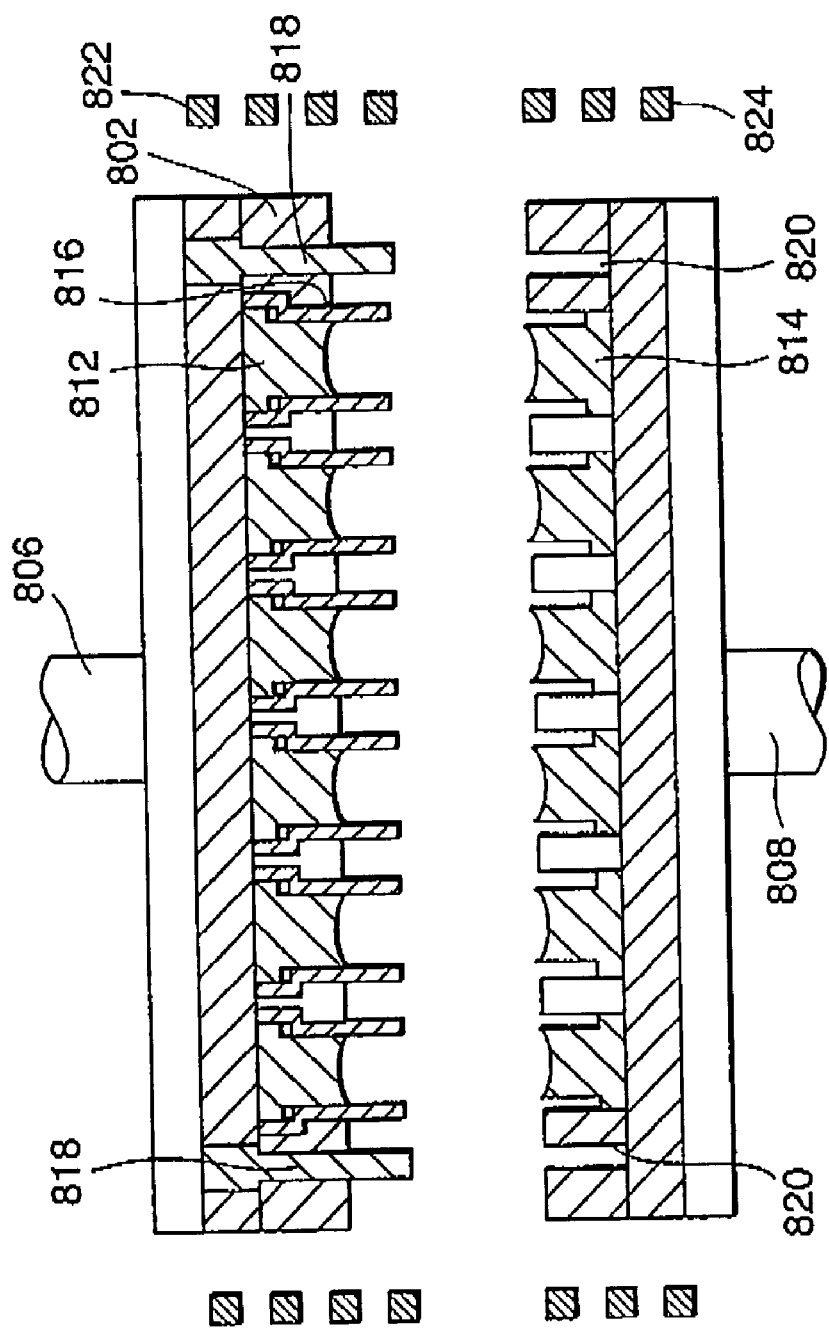
FIG. 10 shows a press molding apparatus according to a fourth embodiment of this invention.
Figure 11A:
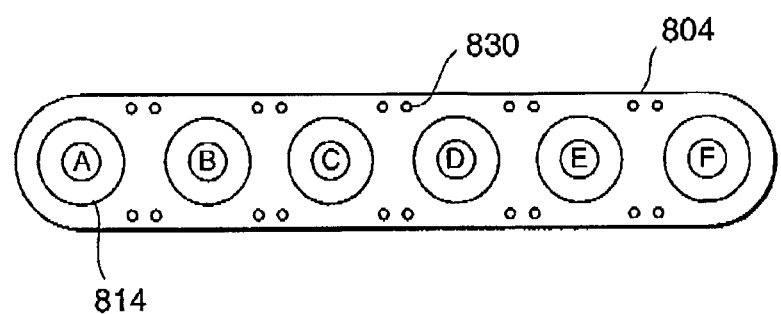
FIG. 11A is a plan view of a lower mother mold in FIG. 10.

Next, description will be made of a fourth embodiment of this invention. Referring to FIG. 10, a press molding apparatus according to the fourth embodiment comprises upper and lower mother molds 802 and 804 provided with six upper mold members and six lower mold members, respectively. The upper and the lower mother molds 802 and 804 are surrounded by upper and lower induction heating coils 822 and 824, respectively. The upper and the lower mother molds 802 and 804 are preheated by the upper and the lower induction coils 822 and 824 while the upper and the lower mother molds 802 and 804 are separated in the vertical direction. FIG. 11A shows the shape of the lower mother mold 804 in plan view. The upper mother mold 802 is similar in shape in plan view to the lower mother mold 804 and is not illustrated in the figure. In this embodiment also, within a region along the outer periphery of the lower mother mold 804, a plurality of perforations 830 are formed in local regions corresponding to areas between every adjacent ones of molding surfaces A to F. The perforations 830 may be replaced by the cutouts illustrated in FIGS. 4A to 4C. Alternatively, use may be made of a combination of the perforations 830 and the cutouts.

As a specific example, a biconvex lens having a diameter of 10 mm was formed by the use of the above-mentioned press molding apparatus. At first, the upper and the lower mother molds 802 and 804 were induction heated by the induction heating coils 822 and 824 illustrated in FIG. 10 to obtain mold temperatures shown in Table 1. Three kinds of the mold temperatures were set as shown in Table 1. The temperature deviation among the lower molding surfaces A to F and the upper molding surfaces (the lower surfaces of the upper mold members 812) was measured by the use of a mold temperature monitoring thermocouple. As a result, the temperature deviation was not greater than ±10° C.

TABLE 1'

| at the start of pressing | | |
|---|---|---|
| preform temperature (viscosity (poise)) | mold temperature (viscosity (poise)) | releasing temperature (° C.) |
| 680 ($10^{5.8}$) | 549 ($10^{10.2}$) | 485 |
| 643 ($10^{6.8}$) | 567 ($10^{9.2}$) | 495 |
| 615 ($10^{7.4}$) | 590 ($10^{8.2}$) | 505 |

Figure 11B:
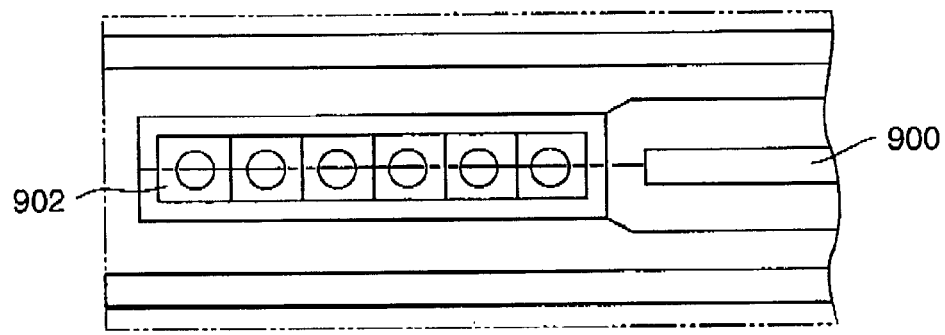
FIG. 11B is a plan view of a support arm used with the pressing mold of FIG. 10.

On the other hand, apart from the preheating of the pressing mold, six preforms were preheated. Referring to FIG. 11B, a support arm 900 which can be opened and closed is provided with six split-type floating saucers 902 (made of glassy carbon) mounted thereon and arranged in series at intervals equal to those of the upper and the lower molds. The six preforms were floated on the floating saucers 902 by air stream blowing up from the below and preheated. Thereafter, the support arm 900 was transferred in synchronism with the temperature elevation of the pressing mold and inserted between the upper and the lower induction heating coils. The support arm 900 was placed at a position directly above the six lower mold members 814. By quickly opening the support arm 900, the floating saucers 902 were split to simultaneously drop and supply the preforms onto the molding surfaces A to F (FIG. 11A). The preforms were preheated at three different preheat temperatures as illustrated in Table 1. Thereafter, the support arm 900 was immediately retreated from the position above the lower mother mold 804. The induction heating coils were deenergized. The lower main shaft 808 was moved upward so that pressing was performed under the pressure of 70 kg/cm². After completion of the pressing, the lenses thus formed were cooled down to the temperature not higher than the glass transition point. During cooling, each lens was applied with the weight of the upper mold 812 alone. Thereafter, the lower mother mold 804 was moved downward by about 40 mm to separate or part the upper and the lower mother molds 802 and 804 from each other. By the use of a suction pad, the lenses were removed. By the induction heating coil, the upper and the lower mother molds were immediately recovered to a pressing start temperature to execute a next forming cycle in the similar manner.

As a result, under any forming condition shown in Table 1, high-quality lenses were continuously obtained. Thus, it is understood that, according to this embodiment, a large amount of lenses can be continuously produced with high efficiency.

As a comparative example for the fourth embodiment, six lenses were press formed by the use of a press molding apparatus similar in structure to that of the fourth embodiment except that upper and lower mother mold have no perforations. As a result, the lenses press formed in four molding surfaces (B–E) except two molding surfaces located at opposite ends exhibited extension error and were not excellent in surface accuracy.

As a specific example for the fourth embodiment, press molding was performed by the use of the press molding apparatus in which the perforations were formed throughout an entire periphery of the mother mold and particularly densely formed in the local regions corresponding to the areas between every adjacent ones of the molding surfaces (see FIG. 5). As a result, it was possible to shorten the time before the target temperature (Table 1) was reached.

Figure 12:
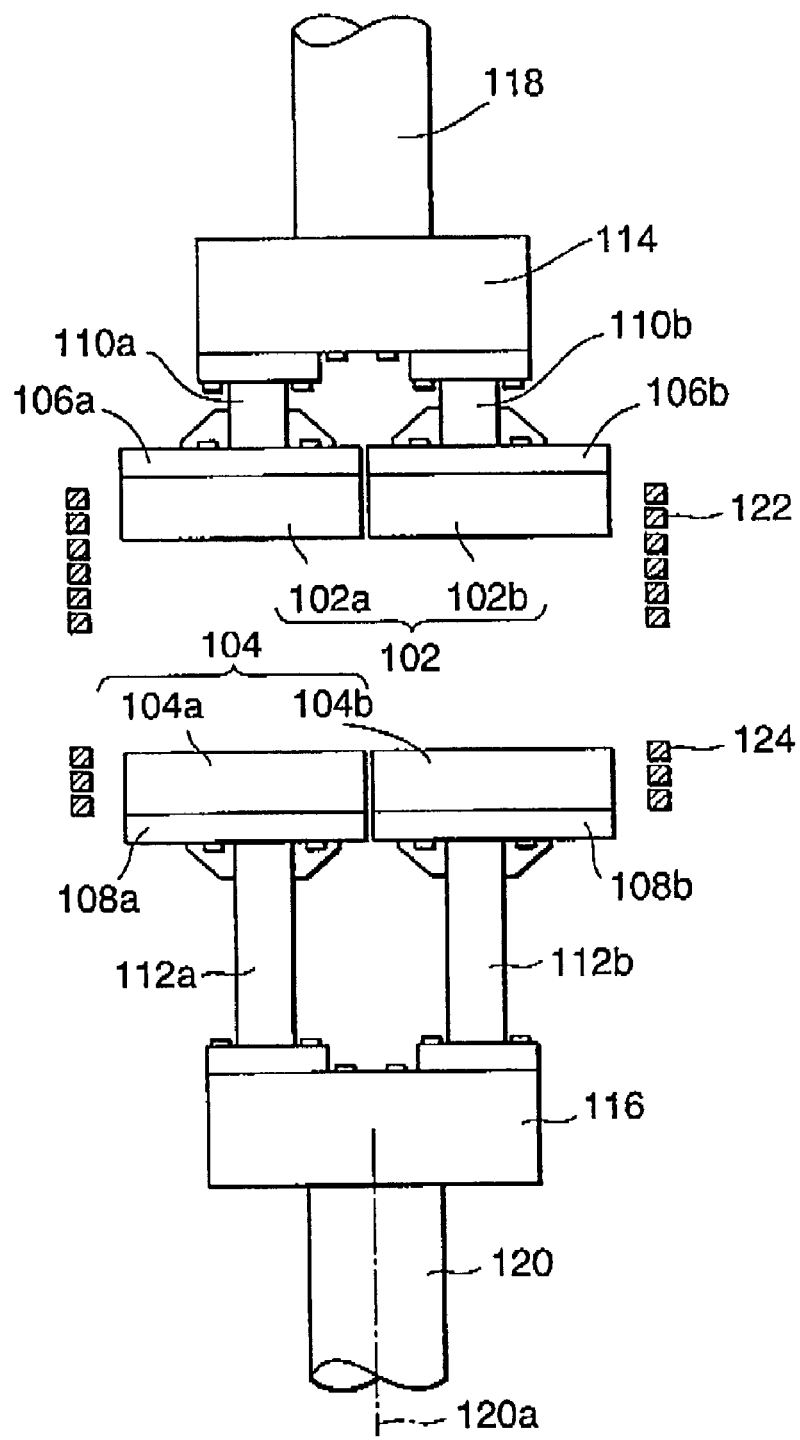
FIG. 12 shows a press molding apparatus according to a fifth embodiment of this invention.

Next referring to FIG. 12, description will be made of a fifth embodiment of this invention. For example, a press molding apparatus according to the fifth embodiment is used to produce a medium-aperture lens having a diameter of 17 mm by the use of a preform prepared by preliminarily forming a glass material into a flat spherical shape. As illustrated in FIG. 12, the press molding apparatus comprises a pressing mold set including an upper mold 102 and a lower mold 104. Each of the upper and the lower molds 102 and 104 has an elongated shape extending in a transversal or horizontal direction in the figure and is made of, for example, a tungsten alloy. The upper and the lower molds 102 and 104 are surrounded by induction heating coils 122 and 124, respectively. The induction heating coils 122 and 124 serve to heat the upper and the lower molds 102 and 104 by high-frequency induction heating, respectively.

The upper mold 102 comprises a pair of left and right upper pressing molds 102a and 102b. The lower mold 104 comprises a pair of left and right pressing molds 104a and 104b. The upper pressing molds 102a and 102b are faced to the lower pressing molds 104a and 104b in a vertical direction, respectively. The upper pressing molds 102a and 102b have upper surfaces fixed to a pair of supporting plates 106a and 106b, respectively. The supporting plates 106a and 106b have upper surfaces attached to upper supporting shafts 110a and 110b, respectively. The upper supporting shafts 110a and 110b are attached to a fixed shaft 118 through a common base 114. On the other hand, the lower pressing molds 104a and 104b have lower surfaces fixed to a pair of supporting plates 108a and 108b, respectively. The supporting plates 108a and 108b have lower surfaces attached to lower supporting shafts 112a and 112b, respectively. The lower supporting shafts 112a and 112b are attached to a drive shaft 120 through a common base 116. The drive shaft 120 is driven by a driving mechanism having an AC servo motor to linearly move in the vertical direction. The drive shaft 120 has a center axis 120a coincident with the center of each of the upper and the lower molds 102 and 104 in the longitudinal direction. When the drive shaft 120 moves in the vertical direction, the upper and the lower molds 102 and 104 are opened and closed.

Figure 13:
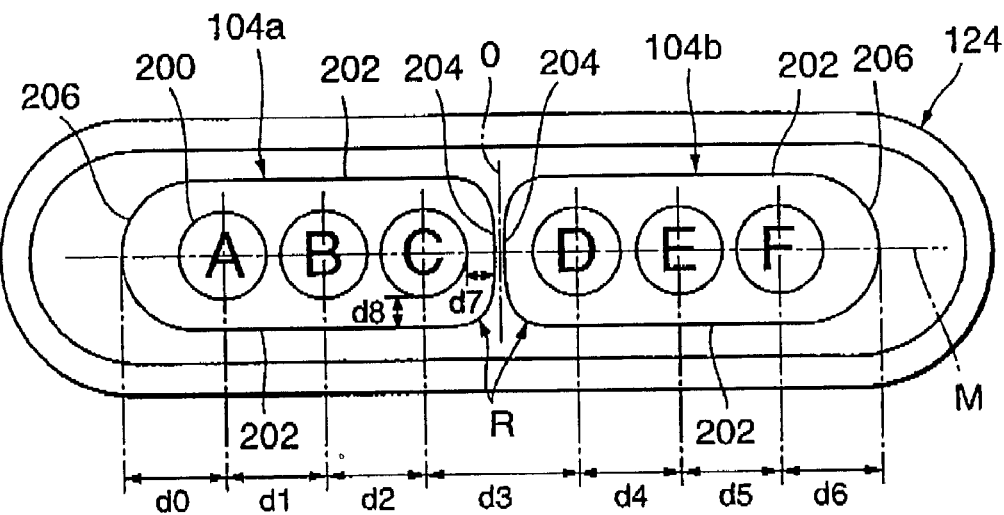
FIG. 13 is a plan view of a lower mold in FIG. 12.

Referring to FIG. 13, the lower mold 104 (lower pressing molds 104a, 104b) and the induction heating coil 124 therearound are shown in plan view as seen from the above. The upper mold 102 (upper pressing molds 102a, 102b) is similar in shape in plan view to the lower mold 104 and is not illustrated in the figure. The lower pressing molds 104a and 104b are symmetrical in shape with respect to a center position O in the longitudinal direction of the lower mold 104. The lower pressing mold 104a has a pair of long sides 202 extending in the longitudinal direction, an inner short side 204 perpendicular to the long sides 202 (and nearest to the center position O), and an outer short side 206 faced to the inner short side 204 (and farthest from the center position O). The outer short side 206 defines an arc of a half circle having a radius equal to a half of the distance between the two long sides 202 (i.e., the width of the lower pressing mold 104a). The other lower pressing mold 104b is symmetrical in shape with the lower pressing mold 104a with respect to the center position O. Preferably, a gap of 0.5–3 mm is formed between the inner short sides 204 of the lower pressing molds 104a and 104b.

The induction heating coil 124 is wound around both of the lower pressing molds 104a and 104b in a shape corresponding to an outer periphery of the lower pressing molds 104a and 104b. The induction heating coil 122 around the upper pressing molds 102a and 102b is similar in shape in plan view to the induction heating coil 124.

The lower pressing mold 104a has an upper surface provided with three molding portions 200 for imparting a glass product shape to preforms. Likewise, the lower pressing mold 104b has an upper surface provided with three molding portions 200. These six molding portions 200 are arranged in a single line on a center line M defining the center of the lower pressing molds 104a and 104b in the widthwise direction. The six molding portions 200 have preform pressing surfaces as molding surfaces A, B, C, D, E, and F, respectively.

Each of the lower pressing molds 104a and 104b has a shape with rounded corners on an adjacent side at which the lower pressing molds 104a and 104b are adjacent to each other. This is because an angled portion was excessively elevated in temperature under high-frequency induction heating in this apparatus. By rounding these corners, temperature distribution in each of the lower pressing molds 104a and 104b was kept uniform. Specifically, each of the corners between the inner short side 204 and the long sides 202 in each of the lower pressing molds 104a and 104b has a curve R. Preferably, the curve R is selected depending on the needed temperature adjustment of the apparatus and, for example, R is an arc having a radius of curvature smaller than a half (W/2) of the width W of the lower mold 104. Instead of the curve R, the corners may be chamfered or may be formed into an obtuse-angled shape. Alternatively, the inner short sides 204 of the lower pressing molds 104a and 104b may have a curved shape.

Description will be made of the arrangement of the molding surfaces A to F in each of the lower pressing molds 104a and 104b. The interval (arrangement pitch) d1 between the molding surfaces A and B, the interval d2 between the molding surfaces B and C, the interval d4 between the molding surfaces D and E, and the interval d5 between the molding surfaces E and F are substantially equal to one another. In addition, the interval d0 between the molding surface A and the outer short side 206 and the interval d6 between the molding surface F and the outer short side 206 are equal to the above-mentioned interval (d1 et al). On the other hand, the interval d3 between the molding surfaces C and D adjacent to each other with the center position O interposed therebetween is greater than the above-mentioned interval (d1 et al). The shortest distance d7 from the molding surface C to the inner short side 204 is substantially equal to the shortest distance d8 from the molding surface C to the long side 202. Likewise, the shortest distance from the molding surface D to the inner short side 204 is substantially equal to the shortest distance from the molding surface D to the long side 202. The above-mentioned relationship of d0 to d8 is determined in order to minimize the temperature difference in the molding surfaces A to F during high-frequency induction heating.

The position of the lower supporting shaft 112a (FIG. 12) in the horizontal plane corresponds to the center position (i.e., the molding surface B) of the molding surfaces A to C of the lower pressing mold 104a in its alignment direction. Likewise, the position of the lower supporting shaft 112b (FIG. 12) in the horizontal plane corresponds to the center position (i.e., the molding surface E) of the molding surfaces D to F of the lower pressing mold 104b in its alignment direction. With this structure, the pressure is uniformly applied to the preforms on the molding surfaces A to F.

Similarly, the positions of the upper supporting shafts 110*a* and 110*b* in the horizontal plane correspond to the center positions of the upper pressing molds 102*a* and 102*b*, respectively.

Each of the lower pressing molds 104*a* and 104*b* has an inner region near to the center position O. In the inner region, the temperature is easily elevated as compared with the remaining region. Therefore, it is preferable to provide an gas cooling unit for locally cooling the above-mentioned inner region, thereby achieving uniform temperature distribution in the lower pressing molds 104*a* and 104*b*. Preferably, a similar cooling unit is provided for the upper pressing molds 102*a* and 102*b*.

Next, description will be made of a method of producing a lens (as a glass optical element) according to this embodiment. At first, by high-frequency induction heating of the induction heating coils 122 and 124, the upper pressing molds 102*a* and 102*b* and the lower pressing molds 104*a* and 104*b* are heated, respectively. Next, the preforms preliminarily formed into a flat spherical shape are supplied to the lower pressing molds 104*a* and 104*b* by the use of a transfer arm (not shown) after the preforms are preheated to a temperature higher than that of the upper pressing molds 102*a* and 102*b* and the lower pressing molds 104*a* and 104*b*. In order to supply the preforms to the lower pressing molds 104*a* and 104*b*, the preforms are positioned above the molding surfaces A to F of the lower pressing molds 104*a* and 104*b* by the use of a positioning member (not shown) and are dropped and supplied onto the lower pressing molds 104*a* and 104*b*. Thereafter, the drive shaft 120 is moved upward to close the upper pressing molds 102*a* and 102*b* and the lower pressing molds 104*a* and 104*b* through the upper supporting shafts 110*a* and 110*b* and the lower supporting shafts 112*a* and 112*b*. As a consequence, the six preforms are pressed between the upper pressing molds 102*a* and 102*b* and the lower pressing molds 104*a* and 104*b* to form lenses having a desired shape. After completion of pressing of the preforms, the drive shaft 120 is moved downward to open or separate the upper and the lower molds 102 and 104. Subsequently, by the use of a removing member (not shown), six glass optical elements left on the lower mold 104 are sucked and removed. Thus, the lenses surface-processed with high precision are obtained.

Figure 14:
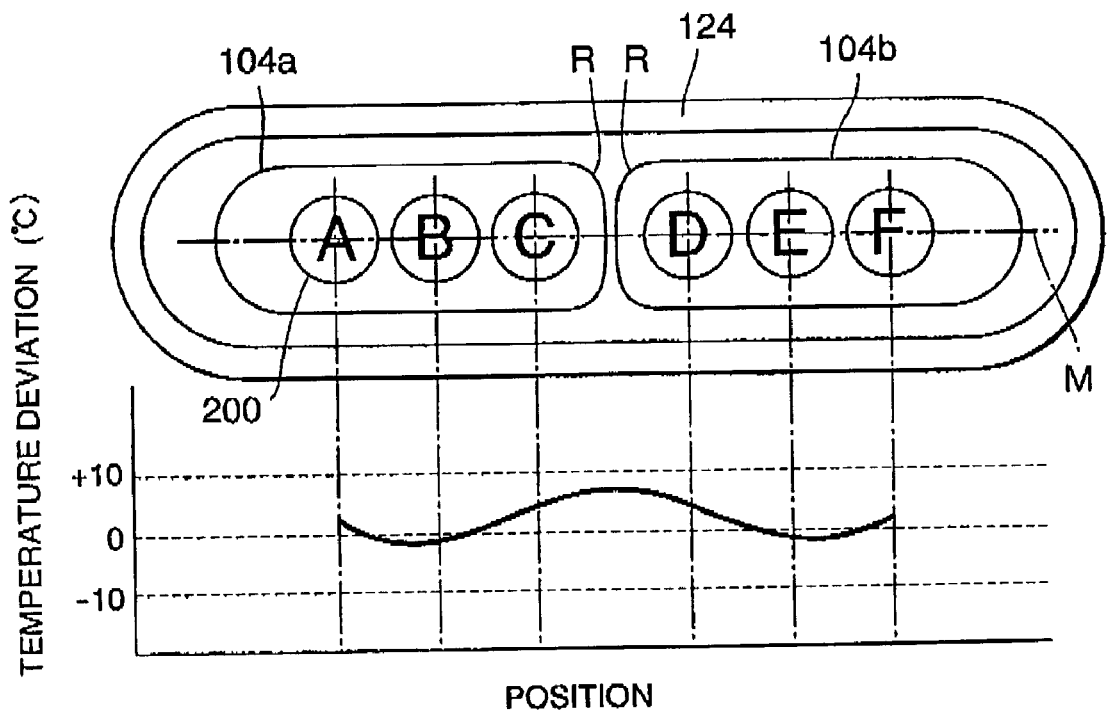
FIG. 14 is a view showing temperature distribution achieved by the fifth embodiment.
Figure 15:
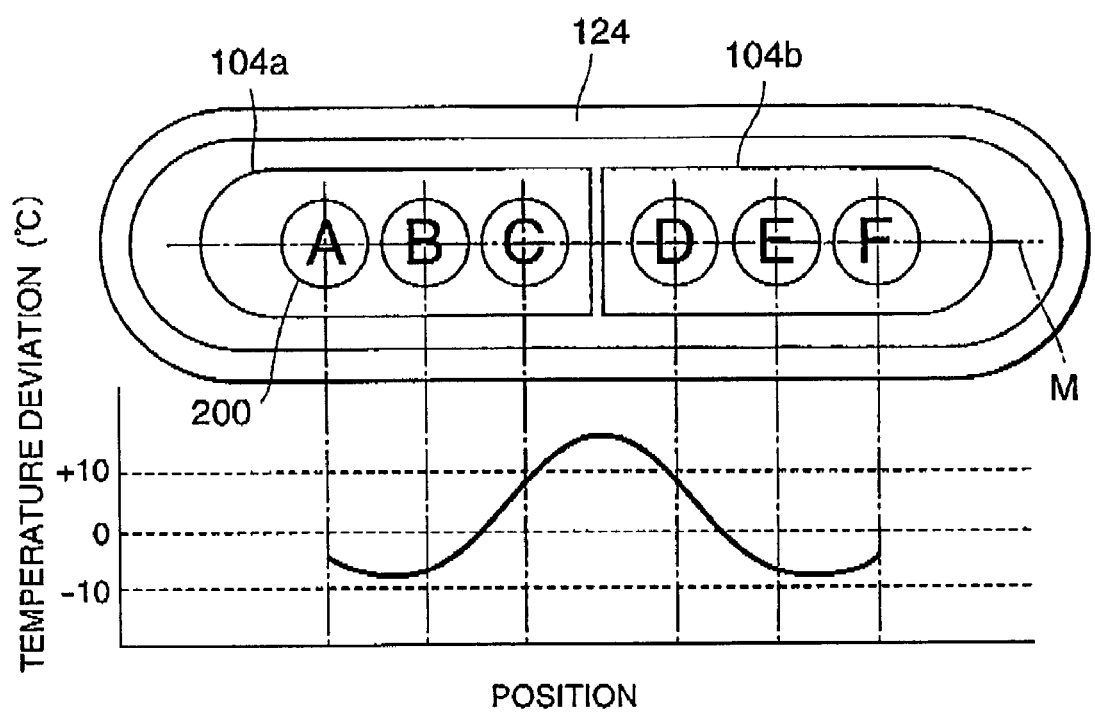
FIG. 15 is a view similar to FIG. 14 with respect to a comparative example.

Next referring to FIGS. 14 and 15, description will be made of the effect achieved by the rounded corners of the upper pressing molds 102*a* and 102*b* and the lower pressing molds 104*a* and 104*b*. Referring to FIG. 14, the temperature distribution was measured at a plurality of positions along the center line M defining the center in the widthwise direction with respect to the lower pressing molds 104*a* and 104*b* according to this embodiment. The temperature distribution is given by the deviation from the average temperature. For comparison, FIG. 15 shows the result of similar measurement in case where the lower pressing molds 104*a* and 104*b* do not have rounded corners but have right-angled corners on the adjacent sides. As seen from FIG. 15, in the lower pressing molds 104*a* and 104*b*, the inner region near to the center position O had a higher temperature as compared with the remaining region. Throughout the lower pressing molds 104*a* and 104*b*, the temperature difference of about 30° C. was observed. This is because the heat tends to concentrate to the angled corners during high-frequency induction heating. On the other hand, as seen from FIG. 14, the temperature difference throughout the lower pressing molds 104*a* and 104*b* is as small as about 10° C. according to this embodiment. This is because excessive local concentration of heat during high-frequency induction heating could be avoided by the rounded corners. Therefore, the mold of FIG. 14 is preferred.

In this embodiment, each of the corners of the lower pressing molds 104*a* and 104*b* has a curve R. The effect of improving the temperature distribution is also obtained by the use of a chamfered corner or an obtuse-angled corner instead of the curve R. Although not described for the upper pressing molds 102*a* and 102*b*, the effect of improving the temperature distribution is also achieved by forming rounded corners like in the lower pressing molds 104*a* and 104*b*.

As described above, the press molding apparatus according to this embodiment of FIG. 14, the upper pressing molds 102*a* and 102*b* and the lower pressing molds 104*a* and 104*b* have rounded corners on the adjacent sides. With this structure, it is possible to avoid local regions from being excessively heated during high-frequency induction heating and to reliably achieve uniform temperature distribution in the upper pressing molds 102*a* and 102*b* and the lower pressing molds 104*a* and 104*b*.

Furthermore, the upper pressing molds 102*a* and 102*b* are supported by the upper supporting shafts 110*a* and 110*b* while the lower pressing molds 104*a* and 104*b* are supported by the lower supporting shafts 112*a* and 112*b*. Therefore, it is possible to equalize the press conditions (such as pressing pressure) of the upper pressing molds 102*a* and 102*b* and the lower pressing molds 104*a* and 104*b*. The upper supporting shafts 110*a* and 110*b* are attached to the single common fixed shaft 118 while the lower supporting shafts 112*a* and 112*b* are attached to the single common drive shaft 120. Therefore, pressing can be accurately performed by the use of the single driving mechanism.

The upper supporting shafts 110*a* and 110*b* support the centers of the upper pressing molds 102*a* and 102*b*, respectively. The lower supporting shafts 112*a* and 112*b* support the centers of the lower pressing molds 104*a* and 104*b*, respectively. Therefore, it is possible to apply uniform pressure to the preforms on the molding surfaces A to F.

The gap of 0.5–3 mm is kept between the upper pressing molds 102*a* and 102*b*. Therefore, no interference is caused between the upper pressing molds 102*a* and 102*b* to thereby perform excellent pressing. Likewise, the gap of 0.5–3 mm is kept between the lower pressing molds 104*a* and 104*b*. Therefore, no interference is caused between the lower pressing molds 104*a* and 104*b* to thereby perform excellent pressing.

Figure 16:
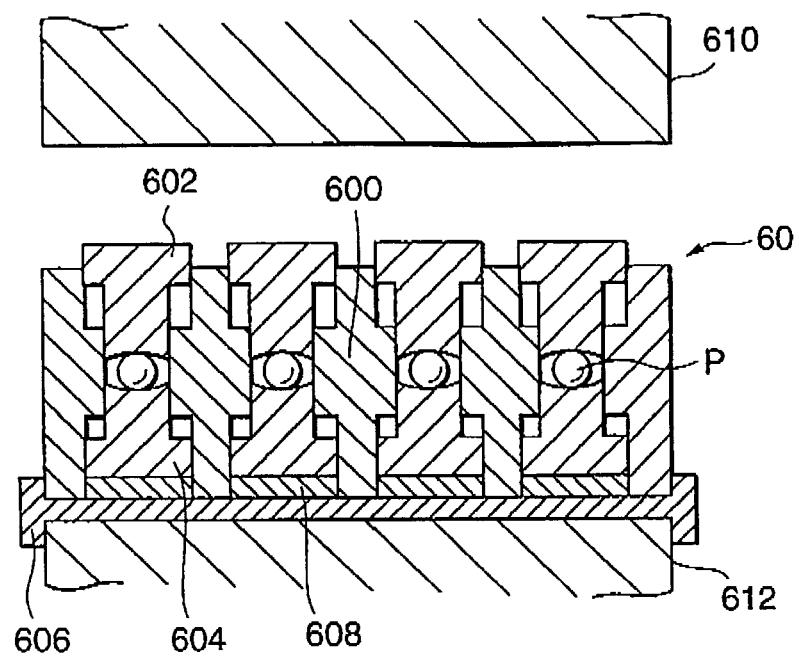
FIG. 16 is a sectional view of a pressing mold according to a sixth embodiment of this invention.

Next referring to FIG. 16, description will be made of a press molding apparatus according to a sixth embodiment of this invention. The press molding apparatus according to the sixth embodiment comprises a pressing mold set including a pair of pressing molds 60 each of which comprises a mother mold 600 having an elongated shape and four pairs of upper and lower mold members 602 and 604 supported by the mother mold 600 to be vertically movable. In FIG. 16, only one of the two pressing molds 60 is illustrated. In each pressing mold 60, the upper mold members 602 and the lower mold members 604 are respectively arranged in a single line. The two pressing molds 60 are placed so that the upper mold members 602 and the lower mold members 604 are respectively arranged in a single line (in a transversal or horizontal direction in FIG. 16). The pressing mold set is surrounded by an induction heating coil (not shown) wound in a generally elliptical shape substantially along the outer periphery of the pressing mold set.

Each of the upper and the lower mold members 602 and 604 is made of cemented carbide and has a molding surface (i.e., a surface for pressing a preform P) coated with a thin film of a precious metal alloy. The mother mold 600 is made of a tungsten alloy and has a thermal expansion coefficient slightly greater than that of cemented carbide. The pressing molds 60 are supported on a tray 606 which is attached to an upper end of a lower supporting shaft 612 driven in a vertical direction. Above the lower supporting shaft 612, an upper supporting shaft 610 as a fixed shaft is arranged. By moving the lower supporting shaft 612 upward, the upper mold members 602 are brought into contact with a head (lower end face) of the upper supporting shaft 610. As a consequence, pressing is performed between the upper and the lower mold members 602 and 604.

The two pressing molds 60 are similar in shape in plan view to the lower pressing molds 104a and 104b illustrated in FIG. 13. That is, the two pressing molds 60 have a shape with rounded corners on adjacent sides.

As a specific example, a biconvex lens having an outer diameter of 15 mm was produced by the use of the above-mentioned press molding apparatus and a spherical preform P of barium borosilicate glass (having a transition point of 512° C. and a sagging point of 545° C.). Specifically, the spherical preform P was placed between each of the upper mold members 602 and each of the lower mold members 604 of the mother mold 600. The mother mold 600 was mounted on the tray 606 and introduced into a forming chamber (not shown) kept in an inactive atmosphere. The tray 606 was placed on the lower supporting shaft 612 (FIG. 12). Thereafter, the lower supporting shaft 612 was moved upward so that the pressing molds 60 are located inside the induction heating coil. The induction heating coil is supplied with a high-frequency current to induction heat the mother mold 600. At this time, the temperature of each of lower molding surfaces (upper surfaces of the lower mold members 604) was measured by a mold temperature monitoring thermocouple inserted into each of the lower mold members 604. On the other hand, the temperature of each of upper molding surfaces (lower surfaces of the upper mold members 602) was measured by a mold temperature monitoring thermocouple inserted into each of the upper mold members 602. As a result, the temperature deviation among the lower molding surfaces and the upper molding surfaces during the induction heating was not greater than ±10° C. Then, the preform was heated by the induction heating coil to 596° C. (the temperature corresponding to the glass viscosity of $10^8$ poises). Thereafter, the lower supporting shaft 612 was further moved upward to bring the upper surfaces of the upper mold members 602 into contact with the head of the upper supporting shaft 610 so that the preform P in a softened state was pressed. Subsequently, the lenses thus formed were cooled to a temperature not higher than the glass transition point. Thereafter, the lower supporting shaft 612 was moved downward and the lenses were removed together with the pressing mold. As a result, the lenses thus obtained were excellent in surface accuracy with less astigmatic aberration and without nonuniform extension.

Figure 17:
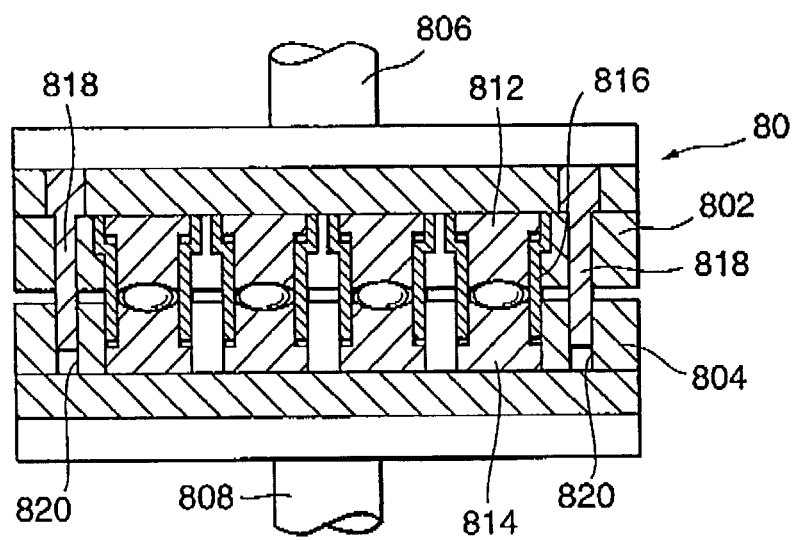
FIG. 17 is a sectional view of a pressing mold according to a seventh embodiment of this invention.

Referring to FIG. 17, description will be made of a press molding apparatus according to a seventh embodiment of this invention. The press molding apparatus according to the seventh embodiment comprises a pressing mold set including a pair of pressing molds 80 each of which comprises an upper mother mold 802 and a lower mother mold 804 provided with four upper mold members 812 and four lower mold members 814, respectively. In FIG. 17, only one of the two pressing molds 80 is illustrated. In each of the pressing molds 80, the upper mold members 812 and the lower mold members 814 are respectively aligned in a single line so that molding surfaces are aligned in a single line. The pressing mold set comprising the two pressing molds 80 is arranged so that the upper mold members 812 and the lower mold members 814 are respectively aligned in a single line (in a transversal or horizontal direction in FIG. 17). The pressing mold set is surrounded by an induction heating coil (not shown) wound in a generally elliptical shape substantially along an outer periphery of the pressing mold set. The upper mother mold 802 is supported by an upper supporting shaft 806 as a fixed shaft. The lower mother mold 804 is fixed to a lower supporting shaft 808 driven in the vertical direction.

Each of the upper mold members 812 is provided with a sleeve 816 formed at its outer periphery and fitted to the lower mold member 814 with a small clearance to be slidable along the lower mold member 814. The sleeve 816 thus serves to prevent axial offset between upper and lower surfaces of a lens. The upper mother mold 802 is provided with guide pins 818 while the lower mother mold 804 is provided with guide holes 820 to be engaged with the guide pins 818. Each of the upper and the lower mother molds 802 and 804 is made of a tungsten alloy. Each of the upper mold members 812, the lower mold members 814, and the sleeves 816 is made of sintered silicon carbide with silicon carbide formed by CVD on the surface thereof.

The two pressing molds 80 are similar in shape in plan view to the lower pressing molds 104a and 104b illustrated in FIG. 13. That is, the two pressing molds 80 have a shape with rounded corners on adjacent sides.

As a specific example, a biconvex lens (one surface being a spherical surface, the other surface being an aspherical surface) having an outer diameter of 10 mm was formed by pressing barium borosilicate glass (having a transition point of 512° C. and a sagging point of 545° C.) using the above-mentioned press molding apparatus. Specifically, preforms of a flat spherical shape prepared by hot forming and having no surface defect were preheated to 470° C. The preforms, four in number, were supplied onto the lower mold members 814, four in number, of the lower mother mold 804 preheated to about 470° C. Immediately thereafter, the lower mother mold 804 was moved upward to be coupled with the upper mother mold 802 preheated to 470° C. At this time, the guide pins 818 and the guide holes 820 were engaged with each other and the sleeves 816 were fitted over the lower mold members 814, respectively. By high-frequency induction heating by the induction heating coil, the upper and the lower mother molds 802 and 804 were heated so that the preforms were heated to 596° C. (i.e., the temperature at which the preform has a viscosity of $10^8$ poises). At this time, the temperature deviation among lower molding surfaces (upper surfaces of the lower mold members 814) and upper molding surfaces (lower surfaces of the upper mold members 812) was measured by the use of a mold temperature monitoring thermocouple. As a result, the temperature deviation was not greater than ±10° C. Thereafter, the lower mother mold 804 was moved upward to perform press molding at a pressure of 70 kg/cm². After completion of the pressing, the lenses thus formed were cooled at a cooling rate of 50° C./min to a temperature not higher than the glass transition point. At this time, each of the upper mold members 812 followed the shrinkage of the lens and the lens was cooled under the weight of the upper mold member 812 alone. In other words, the upper surface of the lens was kept in contact with the upper mold member 812 during cooling. When the temperature was lowered to 490° C., the lower mother mold 804 was moved downward to separate the upper and the lower mother molds 802 and 804 from each other. The lower mother mold 804 was further moved downward to a lower part of a forming chamber (not shown). By the use of a suction pad, four lenses were removed. The lenses thus removed may thereafter be annealed if desired. In these molds (the upper and the lower mother molds 802 and 804, the upper and the lower mold members 812 and 814), substantially uniform heating and cooling were performed. The lenses thus obtained were high in surface accuracy and excellent in surface quality. In addition, eccentricity or decenter after centration was excellent.

Next, description will be made of an eighth embodiment of this invention. A press molding apparatus according to the eighth embodiment comprises a pressing mold set including a pair of pressing molds which is similar in structure to those of the seventh embodiment except that an upper mother mold 802 and a lower mother mold 804 comprise three upper mold members 812 and three lower mold members 814, respectively. Each of the upper and the lower mother molds and the upper and the lower mold members is similar in structure to that in the seventh embodiment (except the number of the upper and the lower mold members). Similar parts are designated by like reference numerals. The two pressing molds are similar in shape in plan view to the lower pressing molds 104a and 104b illustrated in FIG. 13. That is, the two pressing molds have a shape with rounded corners on adjacent sides.

As a specific example, a biconvex lens having a diameter of 10 mm was formed by the use of the above-mentioned press molding apparatus. At first, the upper and the lower mother molds 802 and 804 were induction heated by induction heating coils to obtain mold temperatures shown in Table 1'. Three kinds of the mold temperatures were set as shown in Table 1'. The temperature deviation among lower molding surfaces (upper surfaces of the lower mold members 814) and upper molding surfaces (lower surfaces of the upper mold members 812) was measured by the use of a mold temperature monitoring thermocouple. As a result, the temperature deviation was not greater than ±10° C.

TABLE 1'

| at the start of pressing | | |
|---|---|---|
| preform temperature (viscosity (poise)) | mold temperature (viscosity (poise)) | releasing temperature (° C.) |
| 680 ($10^{5.8}$) | 549 ($10^{10.2}$) | 485 |
| 643 ($10^{6.8}$) | 567 ($10^{9.2}$) | 495 |
| 615 ($10^{7.4}$) | 590 ($10^{8.2}$) | 505 |

Then, six preforms were floated on a transfer arm (not shown) by gas stream and transferred. Thereafter, the transfer arm was placed at a position directly above the six lower mold members 814 and the preforms were simultaneously dropped and supplied onto the lower mold members 814. The preforms were preheated at three different preheat temperatures as shown in Table 1'. Thereafter, the transfer arm was immediately retreated from the position above the lower mother mold 804. The induction heating coils were deenergized. A lower supporting shaft 808 was moved upward and pressing was performed under the pressure of 70 kg/cm². After completion of the pressing, the lenses thus formed were cooled down to the temperature not higher than the glass transition point. During cooling, each lens was applied with the weight of the upper mold 812 alone. Thereafter, the lower mother mold 804 was moved downward by about 40 mm to separate or part the upper and the lower mother molds 802 and 804 from each other. By the use of a suction pad, the lenses were removed. By the induction heating coil, the upper and the lower mother molds were immediately recovered to a pressing start temperature to execute a next forming cycle in the similar manner.

As a result, under any forming condition shown in Table 1', high-quality lenses were continuously obtained. Thus, it is understood that, according to this embodiment, a large amount of lenses can be continuously produced with high efficiency.

As a different example for the eighth embodiment, lenses were formed by the use of a press molding apparatus (see FIG. 15) similar in structure to that of the eighth embodiment except that corners of the pressing molds are not rounded but angled. As a result, the lenses press formed in two molding surfaces (corresponding to C-D in FIG. 15) exhibited slightly inferior surface accuracy to the lenses press formed in four molding surfaces (corresponding to A-B and E-F).

Thus, the embodiments of this invention have been described with reference to the drawing. However, this invention is not restricted to the foregoing embodiments but may be modified in various manners within the scope of the appended claims. In the first through the fourth embodiments, both of the upper and the lower molds are provided with the perforations (or the cutouts). Alternatively, the perforations (or the cutouts) may be formed in only one of the upper and the lower molds.

Thus, according to this invention, it is possible to collectively heat the molding surfaces by the induction heating coil to a desired temperature and to increase the heating rate of the upper and the lower molds because the upper mold and/or the lower mold is provided with the shape-processed heat generator having, for example, the perforations and/or the cutouts allowing a greater amount of heat to be locally generated during high-frequency induction heating.

Furthermore, by forming the shape-processed heat generator having, for example, the perforations and/or the cutouts so that the temperatures of the molding surfaces approach one another during induction heating, the temperature distribution in the inside of the upper mold and/or the lower mold can be kept uniform.

In the fifth through the eighth embodiments, the pressing mold set comprises the two upper and the two lower pressing molds (the upper pressing molds 102a and 102b and the lower pressing molds 104a and 104b). Alternatively, the number of the upper and the lower pressing molds may be three or more. Preferably, these pressing molds are equal in width to one another (in the longitudinal direction of the pressing mold set formed by these pressing molds). In the fifth through the eighth embodiments, each of the upper and the lower molds 102 and 104 has the four or six molding surfaces. However, the number of the molding surfaces may be smaller than or greater than those. Alternatively, each pressing mold may have only one molding surface.

As described above, according to this invention, the pressing mold set comprises a plurality of pressing molds. These pressing molds have a shape with the rounded corners as a processed shape of heat generator on adjacent sides. With this structure, excessive local concentration of heat during high-frequency induction heating can be avoided and the variation in temperature between the molding surfaces formed in the pressing molds is suppressed. As a result, it is possible to produce a plurality of optical elements with high accuracy.

What is claimed is:

1. A press molding apparatus for preparing a plurality of glass optical elements from a plurality of glass materials, comprising:

upper and lower molds each of which comprises a plurality of molding surfaces; and an induction heating device for heating said upper and lower molds;

at least one of said upper and lower mold comprising a heat generator within which heat is generated when said heat generator is subjected to high-frequency induction heating by said induction heating device;

said heat generator comprising a shape-processed portion produced by processing a shape of said heat generator in order that a temperature distribution of said heat generator is adjusted when said heat generator is subjected to high-frequency induction heating.

2. The apparatus according to claim 1, wherein:

said shape-processed portion comprises perforations or cutouts where an amount of heat is locally generated when said heat generator is subjected to said high-frequency induction heating.

3. The apparatus according to claim 1, wherein a range of said temperature distribution of said heat generator in either of upper or lower mold is maintained within 10° C.

4. The apparatus according to claim 2, wherein:

said perforations or cutouts are located on the heat generator so that the temperatures of each molding surface of the upper mold or the lower mold converge.

5. The apparatus according to claim 4, wherein:

said perforations or cutouts are located on the heat generator so that the temperatures distribution of each molding surface of the upper mold or the lower mold is maintained within 10° C.

6. The apparatus according to claim 4, wherein:

each of said upper and lower molds having an elongated shape comprises the molding surfaces arranged in its longitudinal direction;

said perforations and said cutouts are formed in local regions corresponding to areas between adjacent ones of the molding surfaces of said upper or lower molds.

7. The apparatus according to claim 1, comprising:

a pressing mold set comprising a plurality of said pressing molds which are arranged so that the molding surfaces of the upper molds of said pressing molds are aligned in an upper single line and that the molding surfaces of the lower molds of said pressing molds are aligned in a lower single line parallel to said upper single line;

each of the upper and the lower molds of said pressing molds comprises heat generator within which heat is generated when said heat generator is subjected to high-frequency induction heating;

at least a pair of the adjacent heat generators of the upper molds or the lower molds comprises the shape processed portion comprising rounded corners formed on sides of the heat generators adjacent with each other.

8. The apparatus of claim 7, wherein said rounded corners are chamfered corners.

9. The apparatus of claim 7, wherein said rounded corners are curved or obtuse-angled.

10. The apparatus of claim 7, wherein said induction heating device comprises a coil comprising a shape substantially along an outer periphery of said pressing mold set.

* * * * *